United States Patent [19]

Harrington

[11] 4,204,455
[45] May 27, 1980

[54] PLAYING AID FOR KEYBOARD INSTRUMENTS

[76] Inventor: William O. Harrington, 15 Walnut La., Manhasset, N.Y. 11030

[21] Appl. No.: 955,310

[22] Filed: Oct. 27, 1978

[51] Int. Cl.² .............................................. G09B 15/06
[52] U.S. Cl. ......................................... 84/468; 84/453
[58] Field of Search ................. 84/465, 467, 468, 453

[56] References Cited

U.S. PATENT DOCUMENTS

| 623,235 | 4/1899 | Crane | 84/465 |
|---|---|---|---|
| 3,839,938 | 10/1974 | Williams | 84/465 |

FOREIGN PATENT DOCUMENTS 23149 of 1908 United Kingdom ...................... 84/468

Primary Examiner—Lawrence R. Franklin
Attorney, Agent, or Firm—Darby & Darby

[57] ABSTRACT

A playing aid is disclosed to be mounted on the hand for positioning the thumb and fingers to enable the playing of selected intervals of musical pitches on a keyboard instrument such as a piano, organ, synthesizer and the like. The thumb and fourth finger are rigidly held apart a predetermined amount by a pair of grips interconnected by a raised bridging portion adapted to elevate the remaining fingers above the plane of the grips. The device enables simultaneous depression of at least a pair of keys corresponding to selected tonal intervals.

6 Claims, 5 Drawing Figures

PLAYING AID FOR KEYBOARD INSTRUMENTS

BACKGROUND OF THE INVENTION

The invention relates to a device for use in positioning the fingers to reach keys corresponding to selected harmonious intervals on a keyboard instrument such as a piano, organ, synthesizer or the like. In particular, the device enables the untrained player to depress with one hand keys of the instrument successively or simultaneously which are a fixed tonal interval apart on the keyboard while concentrating only on the proper placement of the 4th Finger for example, in accordance with a given melody line.

In the training of keyboard instrument players, it is particularly difficult in the beginning stages of development to provide the student with adequate early capability for producing pleasing melodic sounds. Accordingly, many beginning students quickly lose confidence in their ability to utilize the instrument. This results in many pupils losing interest early in their training and prematurely dropping their musical studies.

It has been discovered that for many people, regardless of their musical background or ability, the interval of the sixth produces a sound particularly pleasing to the ear. Thus, it is advantageous for beginning students of keyboard instruments to be able to play such an interval with one or both hands, while following a simple one note melody line. An ability to produce such harmonious sounds early in the training generates enthusiasm for the instrument and confidence in one's ability to produce real music with it.

Accordingly, the present invention provides a playing aid for use with keyboard instruments, such as the piano, by which the fingers of the playing hand are rigidly postured to a predetermined position in which, for example, the thumb and little (or fourth) finger are held apart by a distance corresponding to a selected keyboard interval, such as a fifth or a sixth. Of course, other intervals may be selected, as desired. The fingers of each hand are therefore retained in the correct position for playing selected harmonies while the player simply concentrates on locating one note at a time with one finger or the thumb. Thus, at the outset of the training, the teacher need only provide relatively simple one-note melody lines for each hand, in accordance with a program of instruction, while the pupil, with the aid of the present device, is able to produce a pleasing harmonious response on the instrument. At the very early stages of instruction, the various notes and melody lines may be color coded so that the pupil is able to play single pieces with meaningful harmony embellishment even before learning to read music.

The playing aid preferably consists of a rigid one-piece molded element having a pair of spaced apart grips or arches to be placed over the thumb and little finger. The grips are interconnected by a raised central portion having an elongated surface for supporting the remaining three fingers of the hand in a position elevated with respect to the thumb and little finger. The finger supporting surface of the raised portion is preferably provided with three transverse concave channels, each of which fits beneath and is supportive of one of the three middle fingers of the hand. The grip to grip spacing of the element fixes the distance between the thumb and little finger to a predetermined musical interval on the keyboard. The middle fingers are held away from the keyboard by the central supporting section.

Each hand may be provided with a playing aid of this type, preferably adapted for different but harmoniously related tonal intervals.

Of course, more advanced players may learn to play triads or more advanced chords by tilting the hand to enable the otherwise elevated middle fingers to depress additional keys or notes, as desired. Similar playing aids may be provided, one for each of a plurality of different desired intervals and they may be constructed so as to fit standard size hands for adults and children of various ages.

BRIEF DESCRIPTION OF THE DRAWINGS

For a further understanding of the present invention, reference may be had to the accompanying drawings in which.

BRIEF DESCRIPTION OF THE PREFERRED EMBODIMENTS

Figure 4:
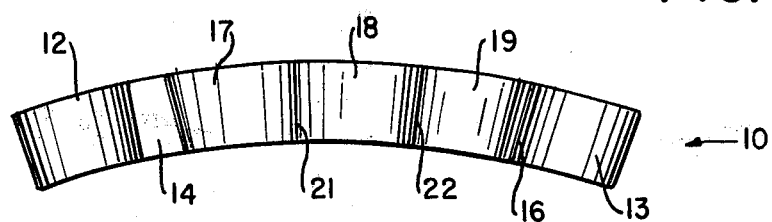
FIG. 4 is a top plan view of the piano playing aid of FIG. 1.
Figure 5:
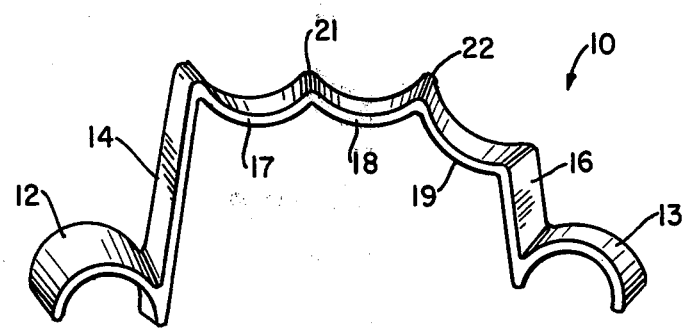
FIG. 5 is a perspective view of the playing aid of FIG. 4.

Referring now to the drawings, and in particular to FIGS. 4 and 5, there is illustrated a playing aid for use with keyboard instruments such as a piano which consists of a rigid shaped or molded support 10, having a raised bridge or supporting ribbon 11 which is flanked by a pair of retaining grips 12 and 13. In the present embodiment, the retaining grips are adapted to engage the thumb and fourth (little) finger of the right hand respectively, although it will be understood that a similar device may be contemplated for use on the left hand as well. The support 10 is preferably molded in one piece and may be constructed of any suitably rigid and durable material such as lightweight metal or plastic. The grips 12 and 13 are preferably in the form of inverted substantially U-shaped arches, although they may also constitute suitable rings or loops without departing from the scope of the invention.

Figure 1:
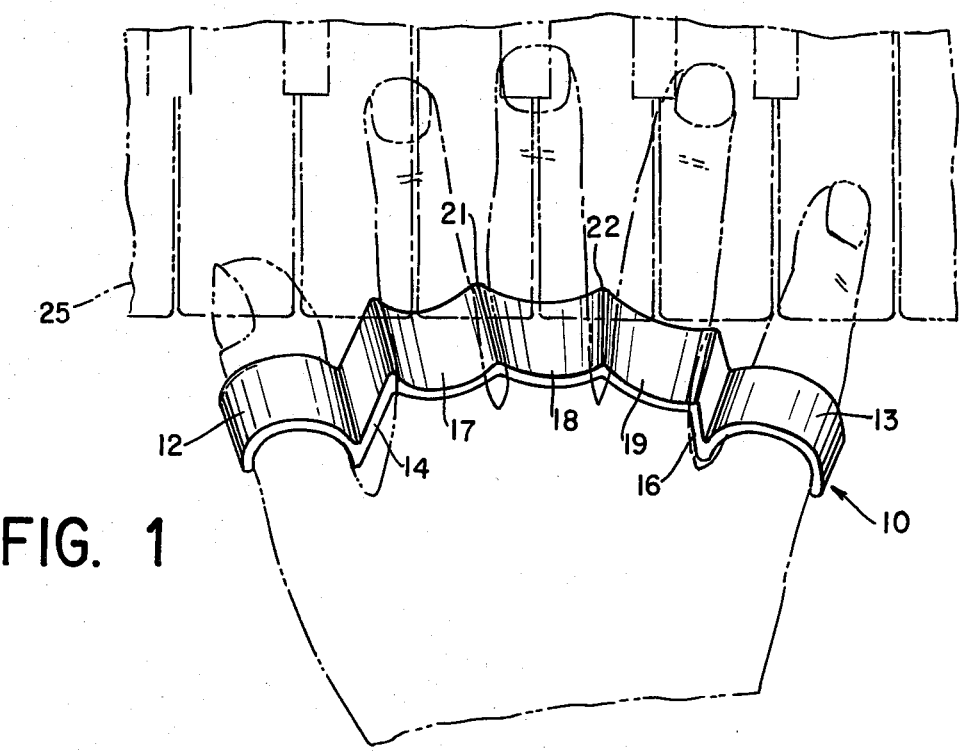
FIG. 1 is a perspective view of a playing aid in accordance the the present invention, mounted on the hand (shown in phantom) of a player of a standard piano keyboard (also in phantom)

In the present embodiment, the bridge section 11 is supported by a pair of generally upright unequal risers 14 and 16, each of which is inclined with respect to the vertical in gently converging directions. The upper surface of the bridge may be substantially flat or even slightly concave, but is preferably formed with three transverse and generally concave finger depressions or channels 17, 18 and 19 traversing the bridge side-by-side in mutually but only slightly diverging directions. These depressions serve to define a pair of spaced apart ridges 21 and 22 which flank the central depression 18. In the present embodiment, the inner surfaces of each of the depressions 17–19 are generally smoothly curved concave surfaces adapted to conform to and to receive the undersurface of the index, second and third fingers, respectively, of the right hand. These fingers therefore rest on top of the bridge and are supported in their respective depressions, as shown in FIGS. 1 and 2.

In contrast, the preferably smoothly curved undersurface of each of the arches 12 and 13 is adapted to fit over and rest on top of the thumb and fourth finger, respectively of the right hand (FIGS. 1 and 2) preferably over the first joint of each to facilitate suitable rigidity therein. In this position, the playing aid is effectively locked into a substantially self-retaining position on the hand, i.e., downward pressure exerted on the device by the three middle fingers serves to press the arches 12 and 13 against the top of the thumb and fourth finger thereby to increase the grip of the device on the hand. Accordingly, the position of the device is not easily shifted, even under relatively severe or active playing conditions, once it is properly situated on the hand.

Figure 2:
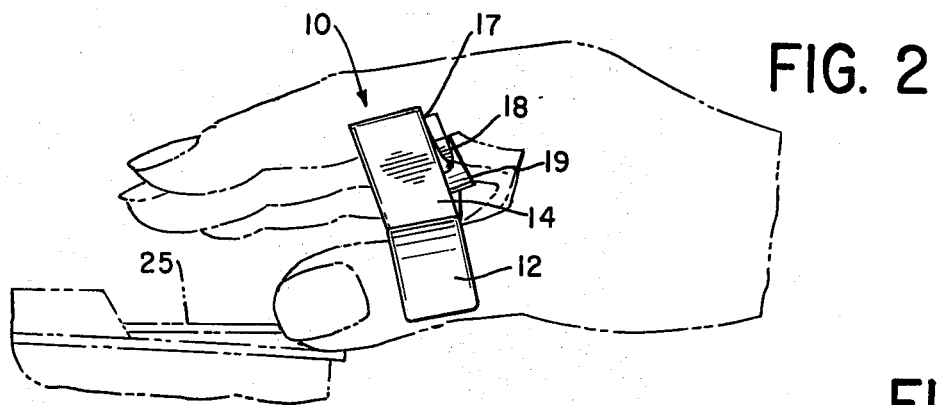
FIG. 2 is an elevated side view of the playing aid of FIG. 1.
Figure 3:
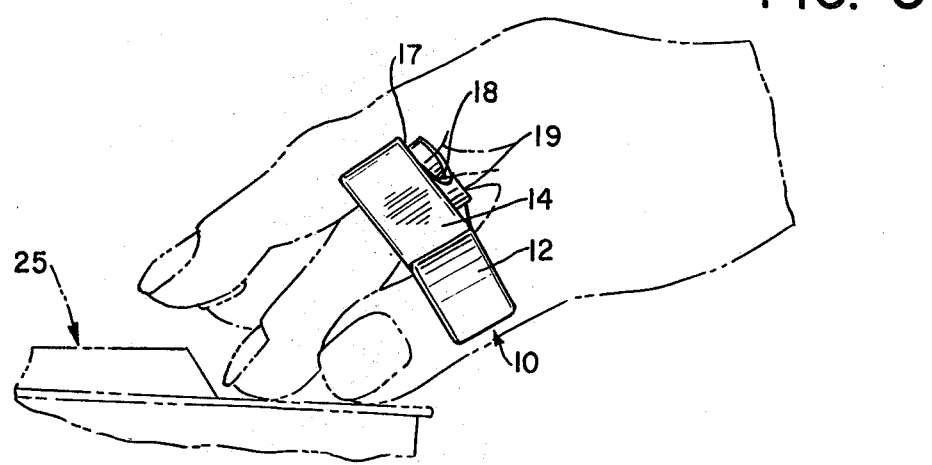
FIG. 3 is a view similar to that of FIG. 2 showing a hand postured by the present playing aid in a variant playing position.

Proper retention of the device may be facilitated, moreover, by providing for the arches to extend around the thumb and fourth finger on substantially three-sides, as shown in FIGS. 2 and 3, so that the playing aid does not have any tendency to drift sideways on the hand. While rings or loops may be provided in lieu of the arches, as set forth above, it is preferable that the playing aid not completely surround the thumb and fourth finger in order that it not interfere with the playing of notes on the piano.

To accommodate the geometry of the human hand, the riser 14, between the thumb arch 12 and the index finger depression 17 is somewhat longer than the riser 16. Accordingly, the undulating central bridge 11 slopes gradually downwardly in the direction of the fourth finger. Moreover, as shown in FIGS. 1 and 4, the bridge 11 may be curved slightly in its longitudinal plane to accommodate or conform to the generally curvilinear alignment of the human knuckles across the hand.

Accordingly, the central axes of each of the finger depressions 17–19 are mutually though only slightly divergent in roughly the same directions as might be expected for the middle fingers of the average relaxed hand. When the playing aid is properly placed on the hand, the bridge section engages both the index and middle fingers just inwardly (toward the knuckle) of the first joint while engaging the third (ring) finger substantially at the first joint. The fingers are thus retained in a natural and relaxed position. It should be understood however, that the position of the playing aid on the hand ought to be adjusted for maximum comfort of the player and may vary, furthermore, depending upon the length of the interval to be played. The ridges 21 and 22 extend upwardly between the index and middle finger and between the middle and third finger respectively thereby to prevent the fingers from unduly shifting their positions during playing of the instrument, and to ensure proper positioning of the middle fingers for more advanced chord work.

The longitudinal curvature in the device causes the thumb and fourth finger to be fixed in divergent positions. The extent of such divergence is determined generally by the length of the device between arches 12 and 13 and, to a lesser extent, by the degree of its longitudinal curvature which may vary slightly depending on the length of the musical interval to be played.

The arch to arch length of any particular playing aid is fixed at a selected distance, generally corresponding to the distance between the keys, for example, of a piano keyboard 25, illustrated in phantom in FIGS. 1–3, which form the desired tonal interval. By way of example, with respect to a playing aid adapted for use with the right hand of a piano player, it has been found that a pleasing harmonious quality is achieved if the thumb and fourth fingers are retained apart at a keyboard distance corresponding to the interval of a tonal sixth, approximately 4⅝ inches, as shown in FIG. 1. With the aid of the present device therefore, a beginning piano player can be assured of playing sixth intervals accurately every time merely by concentrating on the placement of the 4th finger, for example, on an appropriate note of a given melody line. As shown in FIG. 2, the middle fingers of the hand are retained or held at rest above the keyboard in their respective supporting depressions so as not to interfere inadvertently with the desired tonal output.

Of course, similar playing aids may be constructed to enable a person to play other tonal intervals, such as fourths, fifths, sevenths, octaves and tenths, with the thumb and fourth finger, as desired. For more advanced players, playing aids of this type may be provided in which the distance between the arch 12 and the depressions 17, 18 or 19 may be suitably fixed to enable the player to utilize one or more of the middle fingers in playing other shorter tonal intervals such as seconds and thirds. Under these circumstances the player need only position his 4th finger on the proper melody note, and then rock or pivot the hand forward until the otherwise elevated middle fingers are able to depress the keys on the keyboard, as shown in FIG. 3.

It should also be noted that similar devices may be constructed for use on the left hand, and these would constitute a substantially mirror image of the right handed device described above. For the left hand, the device is preferably constructed with arch to arch spacing of the interval of the fifth (3¾") or, for more advanced players, the interval of the seventh (5½"). Full chordal harmonies may therefore be achieved through the use of both hands even though the student is only capable of following single note melody lines for each hand. The device may also be constructed in standard size varieties selected to accommodate average size hand structures of adults and children of various ages.

Where desired, a playing aid of the type described above may be incorporated within a suitable glove such as a golf-type glove (not shown) without finger pockets, to facilitate emplacement and removal of the device and to further ensure against inadvertent displacement of the device during use.

Other modifications of the present invention will occur to those skilled in the art. It is therefore intended that the scope of the invention is not to be limited except as defined in the following claims.

What is claimed is:

1. A playing aid to be mounted on the hand for positioning the thumb and fingers to a predetermined posture for playing selected pitch intervals on a keyboard instrument, the playing aid comprising:
   a pair of grips to engage the thumb and fourth finger, respectively, and being rigidly spaced apart so as to posture the thumb and fourth finger for depression thereby of keys on the keyboard corresponding to a selected interval of musical pitches, each of said grips having a portion overlying the upper surface of its corresponding thumb and finger and being interconnected by a raised bridging portion defining a surface between the thumb and fourth finger for engaging the undersurface of each of the remaining fingers of the hand to elevate said remaining fingers above the plane of said grips to posture them away from the keyboard.

2. The playing aid of claim 1 in which each of said grips comprises a substantially U-shaped arch adapted to fit over the upper surface area of the thumb and fourth finger.

3. The playing aid of claim 1 in which said surface of said bridging portion is provided with a plurality of transverse finger channels side by side, each of said channels being engaged by one of said remaining fingers.

4. The playing aid of claim 3 in which said bridging portion is connected at each end to one of said grips by a riser member, the riser connected to the thumb grip being longer than the riser connected to the finger grip.

5. The playing aid of claim 4 in which said bridging portion is curved in its longitudinal plane whereby the axes for said finger channels are mutually divergent.

6. The playing aid of claim 1 in which said grips are spaced apart by a predetermined distance to enable simultaneous depression by the thumb and fourth finger of keys on the keyboard corresponding to a selected harmonic interval of musical pitches.

* * * * *